United States Patent [19]

Potu

[11] Patent Number: 5,719,594
[45] Date of Patent: Feb. 17, 1998

[54] METHOD AND SYSTEM IN A DATA PROCESSING SYSTEM FOR IMPROVED VIDEO IMAGE RESOLUTION WHEN ENLARGING A VIDEO SEQUENCE

[75] Inventor: Brahmaji Potu, Austin, Tex.

[73] Assignee: International Business Machines Corporation

[21] Appl. No.: 540,386

[22] Filed: Oct. 6, 1995

[51] Int. Cl.$^6$ .................................................. G09G 03/03
[52] U.S. Cl. ......................... 345/130; 345/127; 345/131; 345/132
[58] Field of Search ................................. 345/127, 130, 345/131, 132

[56] References Cited

U.S. PATENT DOCUMENTS

| | | | |
|---|---|---|---|
| 4,242,678 | 12/1980 | Somerville | 340/728 |
| 4,816,913 | 3/1989 | Harney et al. | 358/133 |
| 4,823,201 | 4/1989 | Simon et al. | 358/133 |
| 4,835,607 | 5/1989 | Keith | 358/133 |
| 4,988,984 | 1/1991 | Gonzalez-Lopez | 340/728 |
| 5,008,752 | 4/1991 | Van Nostrand | 358/160 |
| 5,131,057 | 7/1992 | Walowit et al. | 382/41 |
| 5,175,808 | 12/1992 | Sayre | 382/44 |
| 5,202,670 | 4/1993 | Oha | 358/451 |
| 5,224,037 | 6/1993 | Jones et al. | 364/413.19 |
| 5,243,668 | 9/1993 | Kitamura et al. | 383/53 |
| 5,335,295 | 8/1994 | Ferracini et al. | 358/451 |
| 5,384,904 | 1/1995 | Sprague et al. | 395/139 |
| 5,400,051 | 3/1995 | Kruger, Jr. | 345/127 |
| 5,428,401 | 6/1995 | Hinson | 348/586 |
| 5,469,222 | 11/1995 | Sprague | 348/580 |

*Primary Examiner*—Regina D. Liang
*Assistant Examiner*—Joseph Acosta
*Attorney, Agent, or Firm*—John W. Henderson; Lisa B. Yociss; Andrew J. Dillon

[57] ABSTRACT

A method and system in a data processing system are disclosed for improving video sequence image resolution when creating an enlarged final image from an initial image included within the video sequence. An enlargement factor is determined for creating a final image having a final image size from an initial image having an initial image size, where the enlargement factor is the quotient of the final image size divided by the initial image size. An intermediate factor is established to optimize the image resolution and minimizing the hardware required to produce the image. In response to the enlargement factor being less than the intermediate factor, the final image is created from the initial image utilizing the enlargement factor and bilinear interpolation. In response to the enlargement factor being greater than the intermediate factor, an intermediate image is created. The intermediate image has an intermediate size which is greater than the initial image size and less than the final image size. The intermediate image is created utilizing the initial image, the intermediate factor and bilinear interpolation. Thereafter, the final image is created utilizing the intermediate image, the enlargement factor, the intermediate factor, and nearest neighbor interpolation.

23 Claims, 10 Drawing Sheets

METHOD AND SYSTEM IN A DATA PROCESSING SYSTEM FOR IMPROVED VIDEO IMAGE RESOLUTION WHEN ENLARGING A VIDEO SEQUENCE

BACKGROUND OF THE INVENTION

1. Technical Field

The present invention relates to data processing systems, and in particular to improving video sequence image resolution when a final image is enlarged from an initial image within a data processing system. Still more particularly, the present invention relates to utilizing both bilinear interpolation and nearest neighbor interpolation to create a final image enlarged from an initial image included within a video sequence in response to an enlargement factor being greater than an intermediate factor.

2. Description of the Related Art

Modern data processing systems are capable of manipulating and displaying video images. Video images are treated by the data processing system as a source of data which may be displayed within a viewport and manipulated by a user. A user may wish to alter the viewport by changing its size or location, and, hence, alter the size and location of a video image displayed within the viewport. Altering the size of the video image is commonly referred to as "scaling" the video image. Scaling a video image means enlarging or shrinking the size of the video image.

Video images are typically digitized and compressed when they are stored, for example on a CD-ROM. There are several different compression standards that may be utilized. After the video image is digitized, the video image is represented by a plurality of pixels, each pixel having a particular pixel value representing that pixel's color and brightness.

When a user desires to display a stored video image, the data processing system must retrieve the image, decompress it, and resize it if desired before displaying the image. In addition, the user may wish to specify a particular size for the displayed image within a viewport.

A final video image having a final image size may be created, or enlarged, from the decompressed video image. This is typically called "upscaling" the video image. As an example, a compressed video image may be stored having a size of 4×3, or 4 pixels per line and 3 lines, for a total of 12 stored pixels representing the video image. This video image may be upscaled in both the vertical and horizontal directions for display. The final, "upscaled" video image size may be 7×5, or 35 total pixels. In order to create the final video image, the original 12 pixels are utilized and placed at the appropriate locations within the final image. However, as may be easily determined, an additional 23 pixels are needed to complete the image. These 23 pixels have unknown pixel values which must be determined in order to produce a final image. Of course, those skilled in the art will recognize that for some scaling factors, all 12 original pixels may not be used.

Several methods are currently utilized to assign values to these 23 unknown pixels. One method which is often utilized is called "nearest neighbor interpolation". This method simply determines the pixel value for the pixel nearest the pixel having the unknown pixel value, and assigns that pixel value to the pixel having the unknown value. This method is utilized until all pixels have a known value. Nearest neighbor interpolation is the simplest method for upscaling video images requiring the least amount of hardware to implement. However, it does not always produce a smooth and accurate final image.

Another method which has been utilized is called "bilinear interpolation". Bilinear interpolation is the process of taking a weighted average of the pixel values surrounding the pixel having the unknown value taking into account the relative location of the surrounding pixels. The weighted average value is then assigned to the pixel having the unknown value. Although bilinear interpolation produces a smoother final image, it can require a substantial amount of hardware to implement, particularly where the image to be upscaled is a video data stream.

Often a user will desire to upscale video images from real-time sources such as a camera or video cassette recorder (VCR). If a video image is digitized from a National Television Systems Committee (NTSC) source, for example, the source image will have a square pixel resolution of 640×240 pixels per field. This image may be upscaled to a target image having a pixel resolution of 1280×1024 pixels per field displayed at a rate of 30 frames per second. In order to upscale such a large number of pixels, bilinear interpolation requires an enormous amount of hardware.

Therefore, it should be apparent that a need exists for a method and system for improving image resolution when creating an enlarged final image from an initial image while optimizing the image resolution and minimizing the hardware required to produce the image.

SUMMARY OF THE INVENTION

It is therefore one object of the present invention to provide an improved data processing system.

It is another object of the present invention to improving video sequence image resolution when a final image is enlarged from an initial image included within a video sequence within a data processing system.

It is yet another object of the present invention to utilize both bilinear interpolation and nearest neighbor interpolation to create a final image enlarged from an initial image included within a video sequence in response to an enlargement factor being greater than an intermediate factor.

A method and system in a data processing system are disclosed for improving video sequence image resolution when creating an enlarged final image from an initial image included within the video sequence. An enlargement factor is determined for creating a final image having a final image size from an initial image having an initial image size, where the enlargement factor is the quotient of the final image size divided by the initial image size. An intermediate factor is established to optimize the image resolution and minimizing the hardware required to produce the image. In response to the enlargement factor being less than the intermediate factor, the final image is created from the initial image utilizing the enlargement factor and bilinear interpolation. In response to the enlargement factor being greater than the intermediate factor, an intermediate image is created. The intermediate image has an intermediate size which is greater than the initial image size and less than the final image size. The intermediate image is created utilizing the initial image, the intermediate factor and bilinear interpolation. Thereafter, the final image is created utilizing the intermediate image, the enlargement factor, the intermediate factor, and nearest neighbor interpolation.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1A:
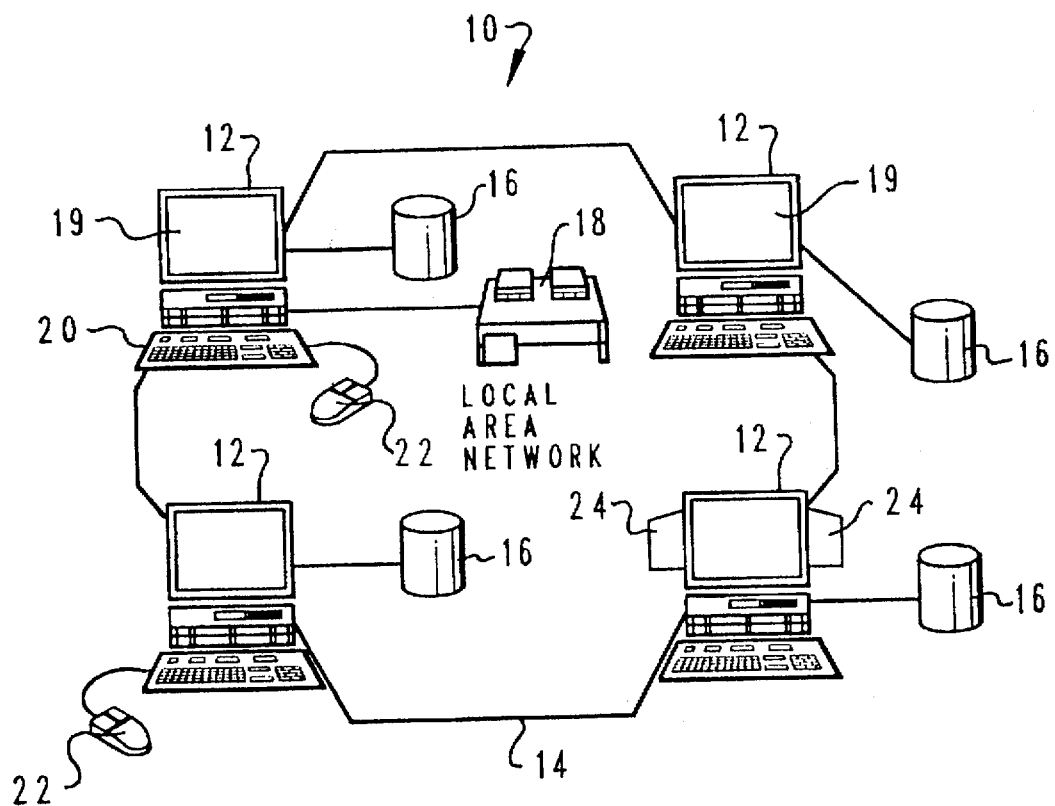
FIGS. 1A and 1B depict a pictorial representation of a data processing system which may be utilized to implement the method and system of the present invention.
Figure 1B:
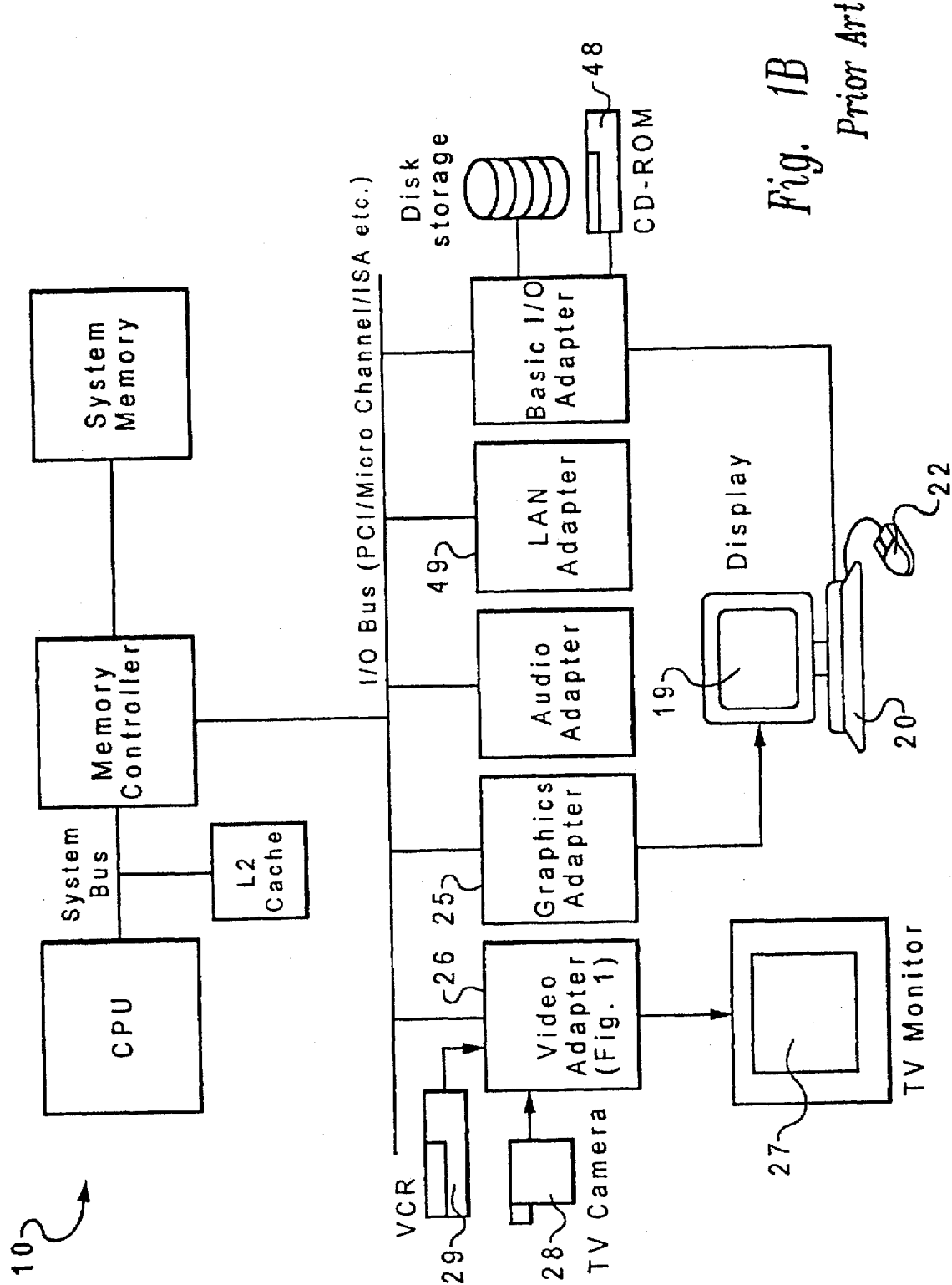

With reference now to the figures and in particular with reference to FIGS. 1A and 1B, there is depicted a pictorial representation of a data processing system 10 which may be utilized to implement the method and system of the present invention. In a preferred embodiment, data processing system 10 may include a plurality of computers 12 which may be connected together in a local area network 14. Of course, those skilled in the art will appreciate the method and system of the present invention may be implemented utilizing a stand-alone computer or workstation such as depicted in FIG. 1B.

As is common in such data processing systems, each individual computer may be coupled to a storage device 16 and/or a printer/output device 18. One or more such storage devices may be utilized to store the various data objects or multimedia files including video images which may be periodically accessed, processed, and displayed within data processing system 10 in accordance with the method and system of the present invention. Multimedia files may include audio data, video images, or textual data.

Each computer 12 may be implemented utilizing any suitably configured personal computer, mini-computer, mainframe computer, or a computer running in a distributed network of other computers. Computer 12 has associated therewith a computer display 19, keyboard 20, input point device 22, and speakers 24.

A graphics adapter 25 may be included to generate an image to be displayed on display 19. Graphics adapter 25 may include video acceleration hardware. In addition, video adapter 26 may be included which is capable of digitizing a video signal generated utilizing camera 28 or VCR 29. Video adapter 26 might also include a video codec that can decompress video sequence images retrieved from storage devices such as a CD-ROM 48 or from a LAN adapter 49. If a hardware video codec is not present, the video decompression function may be performed by system software. Sources of the video image sequence may include a video camera 28, VCR 29, or CD-ROM 48.

Figure 2:
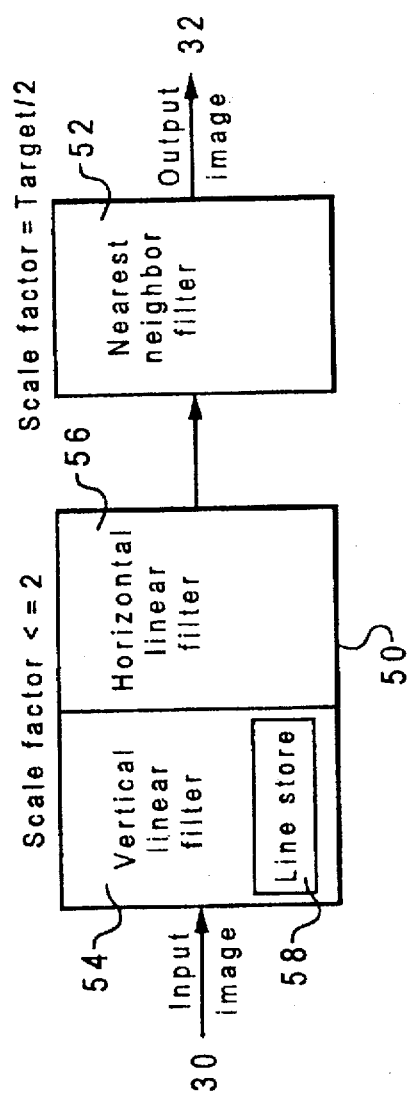
FIG. 2 illustrates a block diagram of a bilinear interpolation filter and nearest neighbor interpolation filter in accordance with the method and system of the present invention.

Utilizing the method and system of the present invention, less hardware is needed to upscale a video sequence of images while still maintaining a high level of resolution in the upscaled video images. FIG. 2 depicts a bilinear filter 50 which includes a vertical linear filter 34 and a horizontal linear filter 56, and a nearest neighbor filter 52. An input image 30 which is included within a video sequence is input into vertical filter 34. The image is then output from vertical filter 34 and input into horizontal linear filter 56. The image is upscaled by bilinear filter 50 by a factor of two or less. The image is then output from the horizontal linear filter 56 and input into nearest neighbor filter 52. A final image 32 is then output from nearest neighbor filter 52. The image is then upscaled by nearest neighbor filter by a factor equal to the target image size divided by two. The method and system of the present invention requires only one video line of storage as depicted at block 58, thus reducing the amount of hardware required to enlarge a video sequence while maintaining a high level of image resolution.

Figure 3:
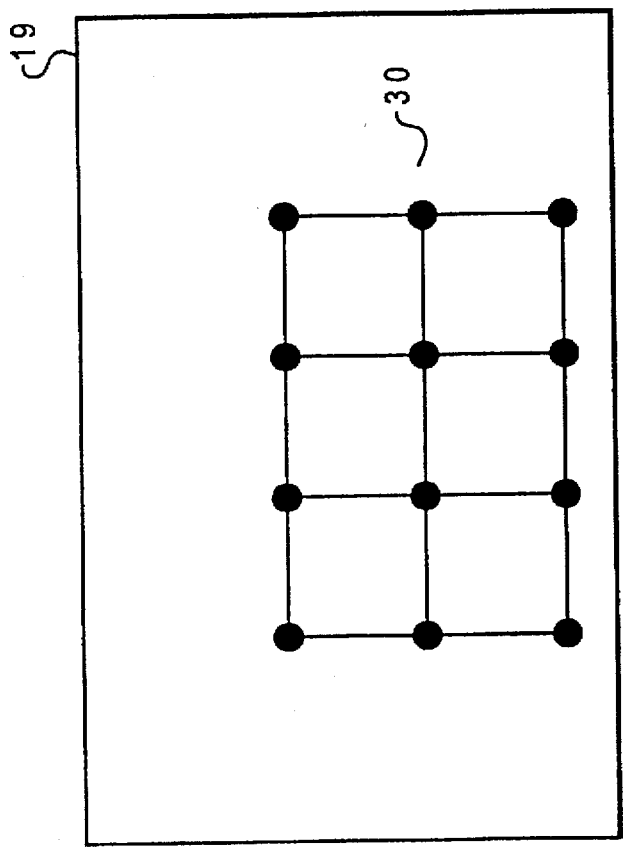
FIG. 3 illustrates a pictorial representation of an initial video image included within a video sequence having an initial image size of 4 pixels by 3 lines displayed on a display within a data processing system in accordance with the method and system of the present invention.

FIG. 3 is a pictorial representation of an initial video image having an initial image size of 4 pixels by 3 lines displayed on display 19 within data processing system 10 in accordance with the method and system of the present invention.

Figure 7:
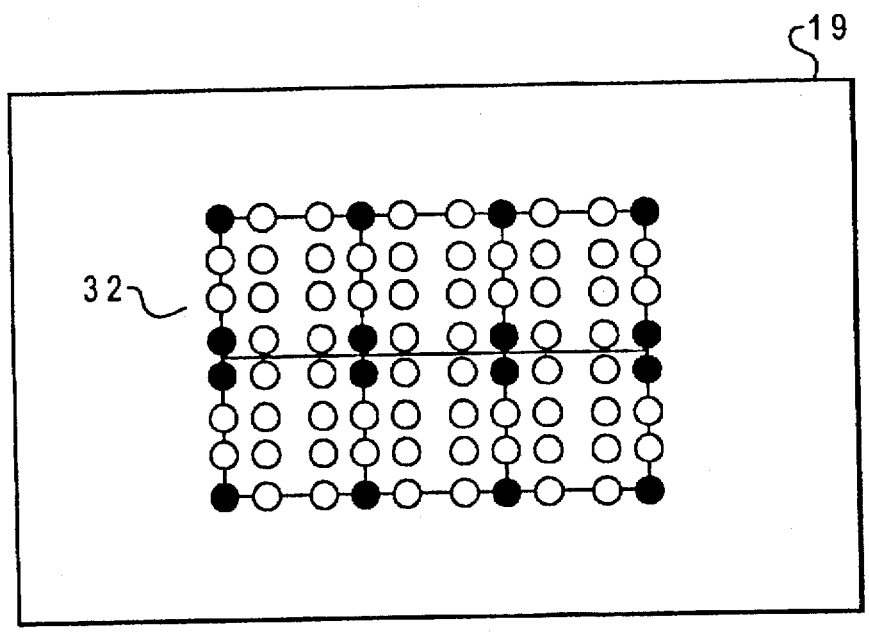
FIG. 7 illustrates a pictorial representation of a final image having a final image size of 10 pixels by 8 lines displayed on a display within a data processing system in accordance with the method and system of the present invention.
Figure 8A:
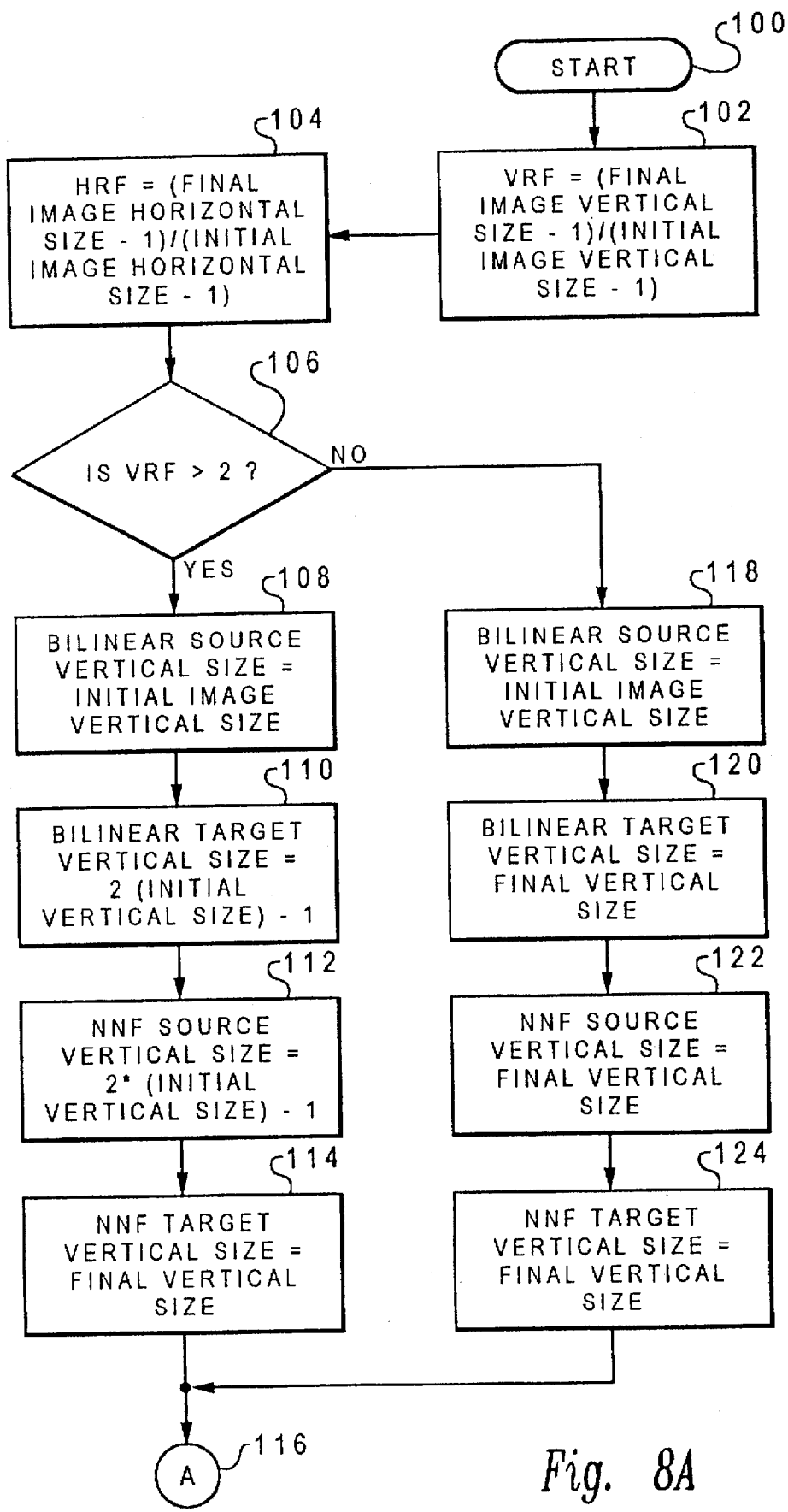
FIGS. 8A–8E together depict a high-level flow chart illustrating the utilization of both bilinear interpolation and nearest neighbor interpolation to create a final image included within a video sequence in response to an enlargement factor being greater than an intermediate factor in accordance with the method and system of the present invention.
Figure 8B:
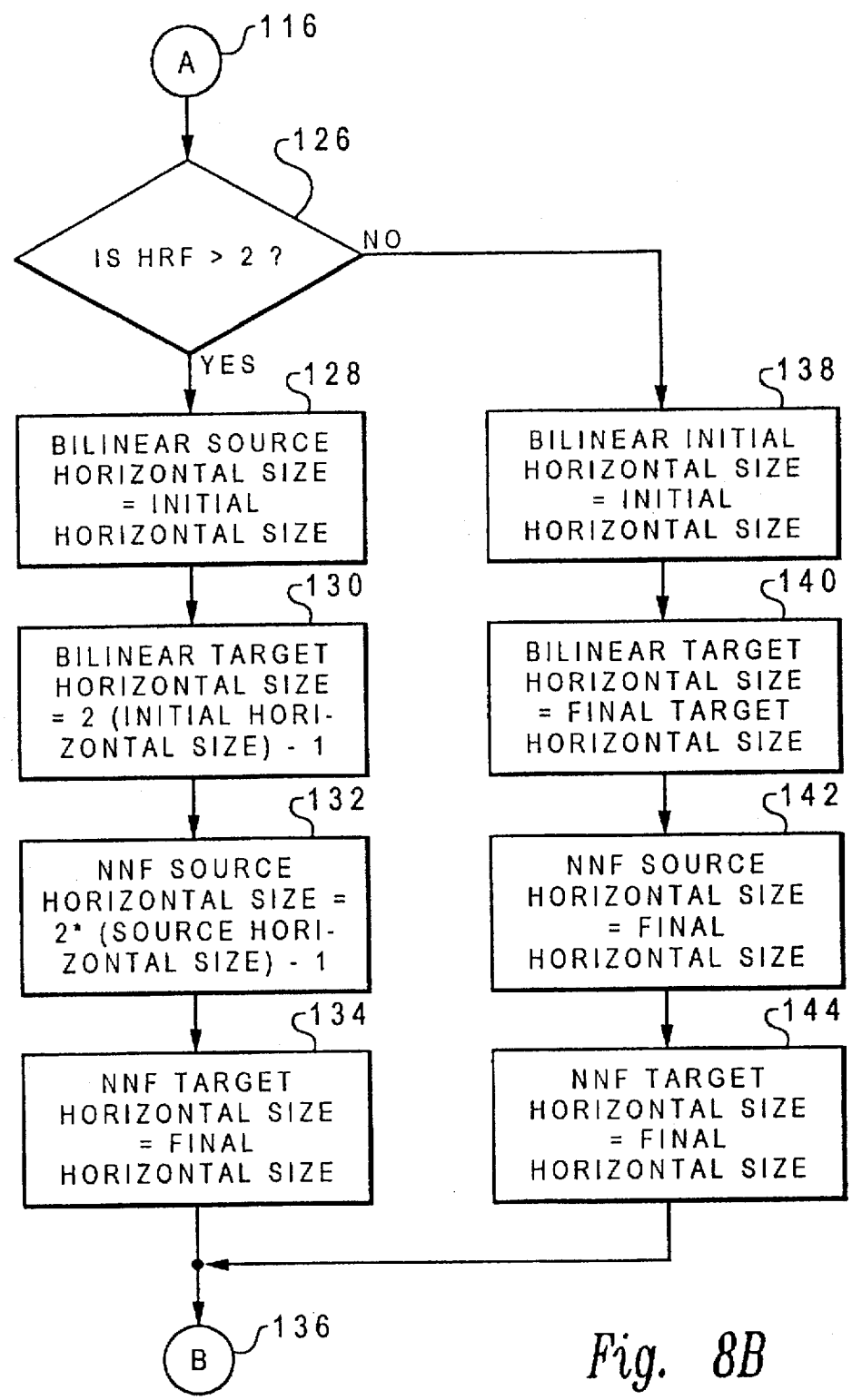
Figure 8C:
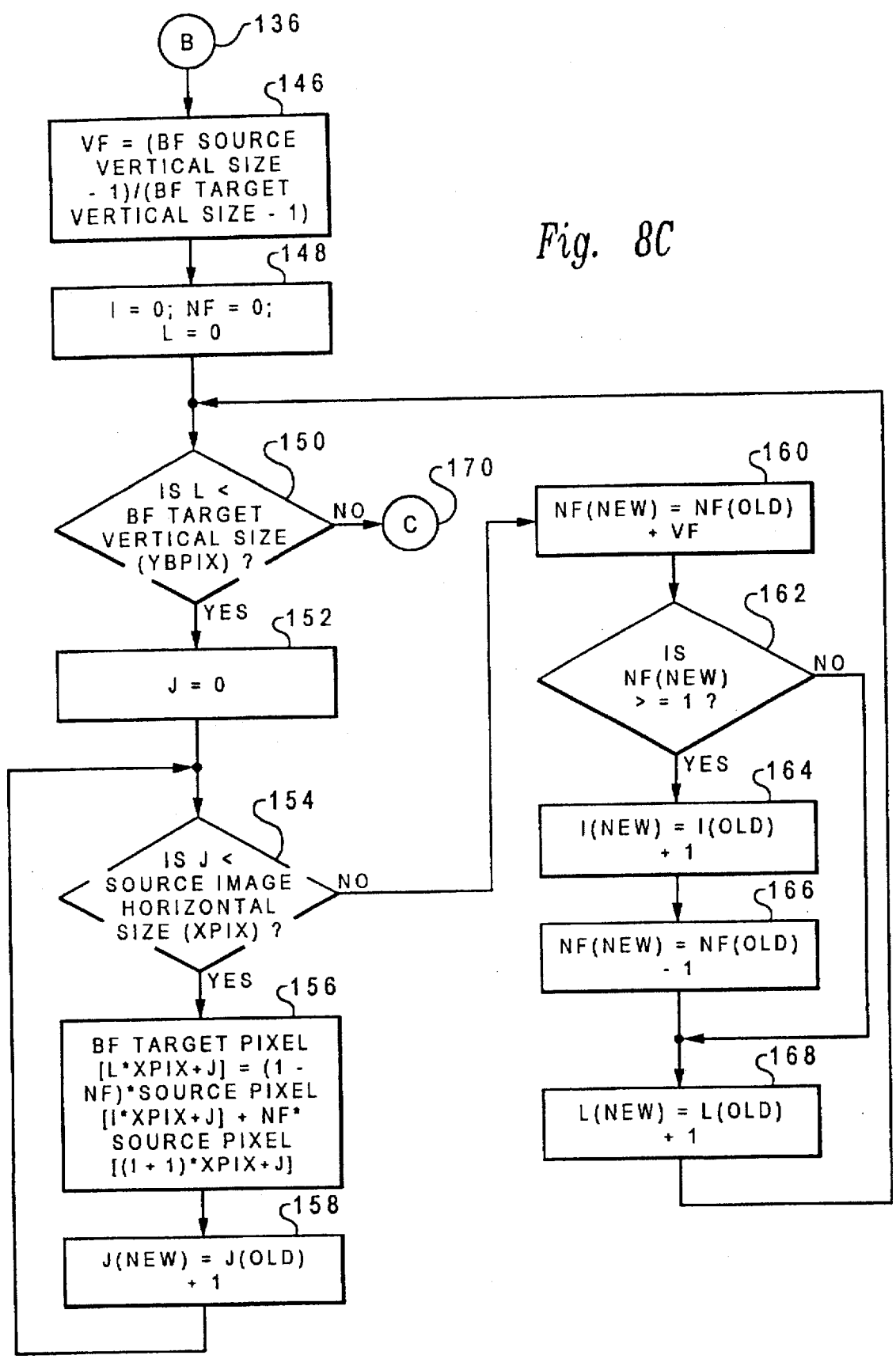
Figure 8D:
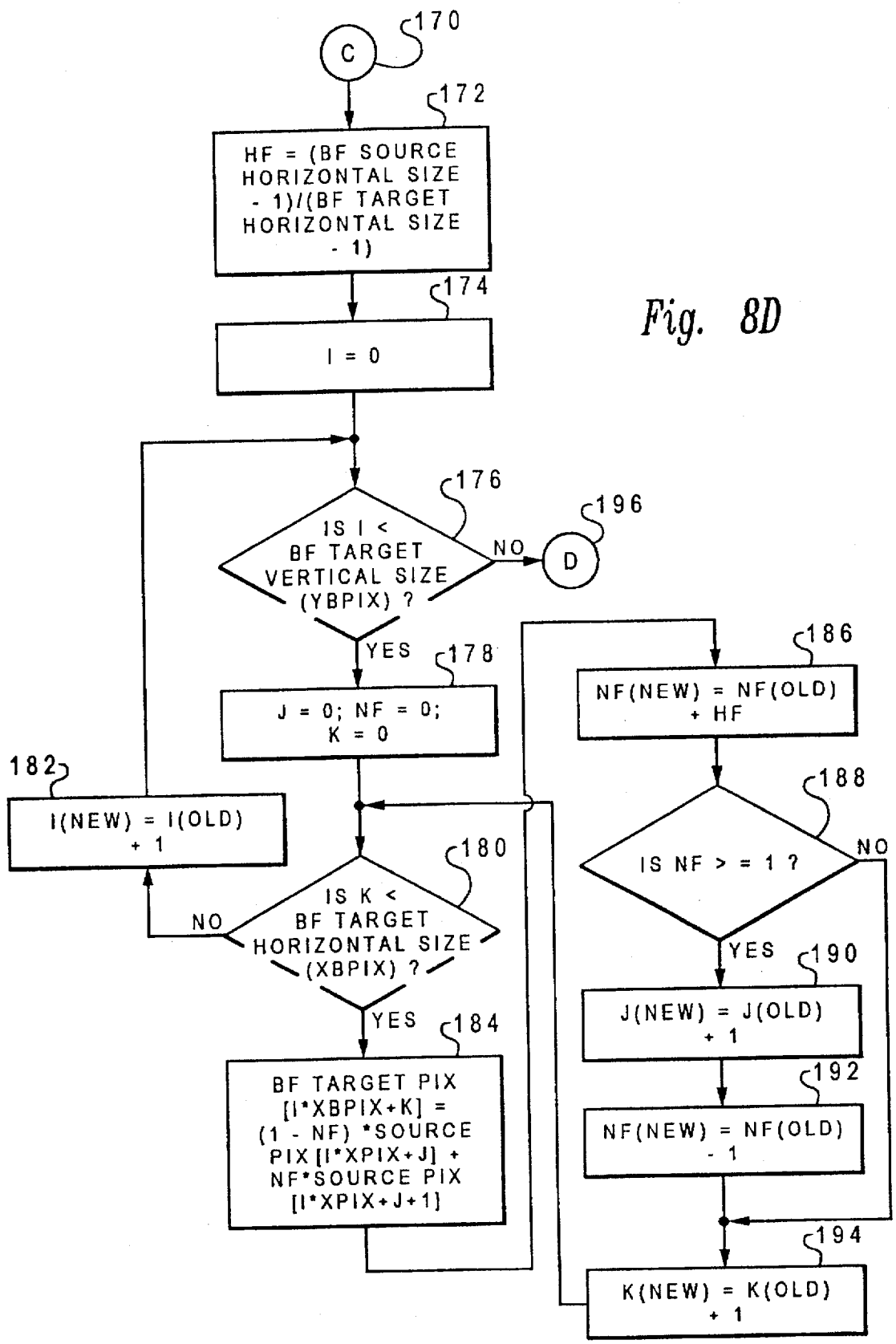
Figure 8E:
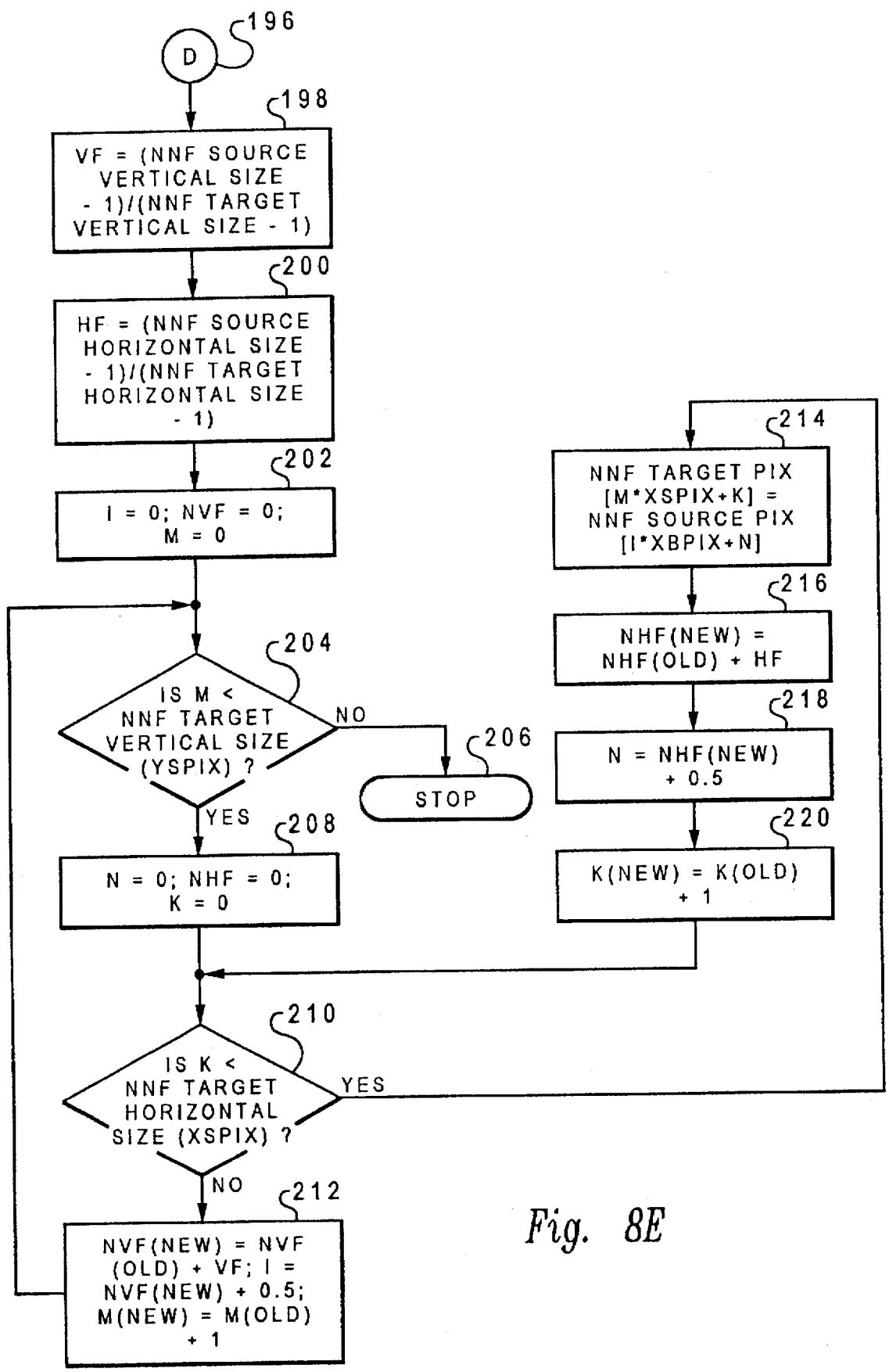

A user may desire to upscale an initial image 30 having an initial image size of 4 pixels by 3 lines to a final image 32 having a final image size of 10 pixels by 8 lines, see FIG. 7. In order to complete the enlargement of initial image 30 to final image 32, an enlargement factor is first determined. The enlargement factor is the quotient of the final image size minus one divided by the initial image size minus one. An intermediate factor is then established. In order to optimize the image resolution of final image 32 without unduly increasing the hardware complexity of data processing system 10, an intermediate factor of 2 is established. Those skilled in the art will recognize that as hardware included within data processing system 10 is improved, a different intermediate factor may be established.

In response to the enlargement factor being less than the intermediate factor, final image 32 is created from initial image 30 utilizing bilinear interpolation. Bilinear interpolation algorithms are commonly known in the art. In response to the enlargement factor being greater than the intermediate factor, an intermediate image having an intermediate size is created from the initial image utilizing the intermediate factor and bilinear interpolation. Thereafter, final image 32 is created from the intermediate image utilizing the enlargement factor, the intermediate factor, and nearest neighbor interpolation. Algorithms to perform nearest neighbor interpolation are commonly known in the art.

The enlargement factor is determined separately in both the vertical and horizontal directions. When the enlargement factor in the vertical direction is less than the intermediate factor, a final image is created from the initial image utilizing bilinear interpolation in the vertical direction. The final image in the vertical direction is then greater than the initial image by a factor equal to the enlargement factor in the vertical direction.

When the enlargement factor in the vertical direction is greater than the intermediate factor, an intermediate image is created from the initial image utilizing the intermediate factor, and bilinear interpolation in the vertical direction. The intermediate image in the vertical direction is then greater than the intermediate image by a factor equal to the intermediate factor. A final image is then created from the intermediate image utilizing the intermediate factor, the enlargement factor, and nearest neighbor interpolation in the vertical direction. The final image is then greater than the intermediate image in the vertical direction by a factor equal to the enlargement factor divided by the intermediate factor.

When the enlargement factor in the horizontal direction is less than the intermediate factor, a final image is created from the initial image utilizing bilinear interpolation in the horizontal direction. The final image in the horizontal direction is then greater than the initial image by a factor equal to the enlargement factor in the horizontal direction.

When the enlargement factor in the horizontal direction is greater than the intermediate factor, an intermediate image is created from the initial image utilizing the intermediate factor, and bilinear interpolation in the horizontal direction. The intermediate image in the horizontal direction is then greater than the intermediate image by a factor equal to the intermediate factor. A final image is then created from the intermediate image utilizing the intermediate factor, the enlargement factor, and nearest neighbor interpolation in the horizontal direction. The final image is then greater than the intermediate image in the horizontal direction by a factor equal to the enlargement factor divided by the intermediate factor.

In the example shown in FIGS. 3–7, the enlargement factor in the vertical direction is (8-1)/(3-1) which is greater than the intermediate factor of 2. The enlargement factor in the horizontal direction is (10-1)/(4-1) which is greater than the intermediate factor of 2. Therefore, an intermediate image will be enlarged from the initial image by a factor of two of the initial image size utilizing bilinear interpolation in both the vertical and horizontal directions. Thereafter, a final image will be created from the intermediate image by a factor of 7/4 of the intermediate size in the vertical direction and a factor of 3/2 of the intermediate size in the horizontal direction utilizing nearest neighbor interpolation.

Figure 4:
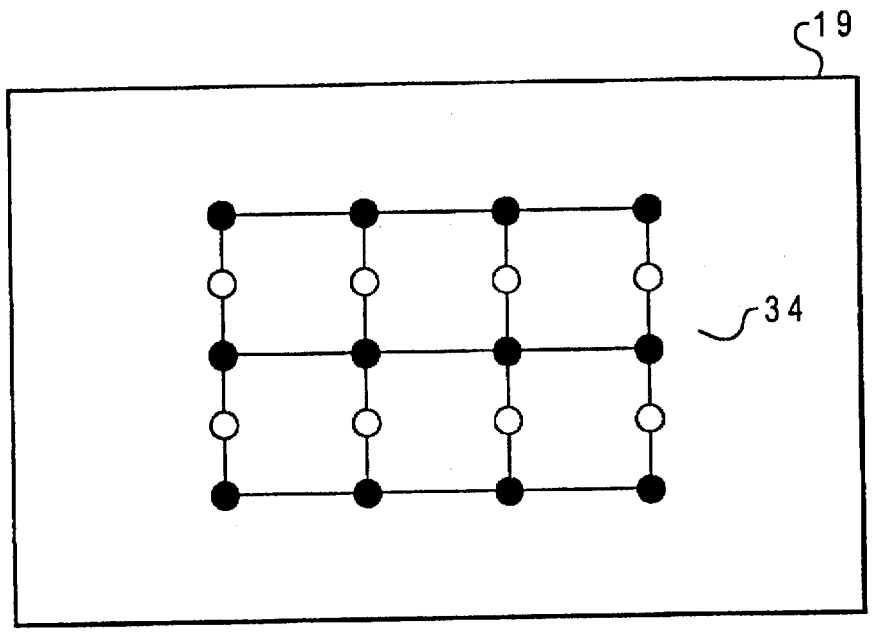
FIG. 4 depicts a pictorial representation of a first intermediate image having a first intermediate image size of 4 pixels by 5 lines displayed on a display within a data processing system in accordance with the method and system of the present invention.

FIG. 4 is a pictorial representation of a first intermediate image 34 having an image size of 4 pixels by 5 lines displayed on display 19 and created within data processing system 10, wherein the first intermediate image is determined utilizing the initial image and a bilinear interpolation in the vertical direction in accordance with the method and system of the present invention.

First intermediate image 34 is created from initial image 30 utilizing bilinear interpolation in the vertical direction only and the intermediate factor of 2. Additional pixels are added to create a resulting first intermediate image size of 4 pixels by 5 lines.

Figure 5:
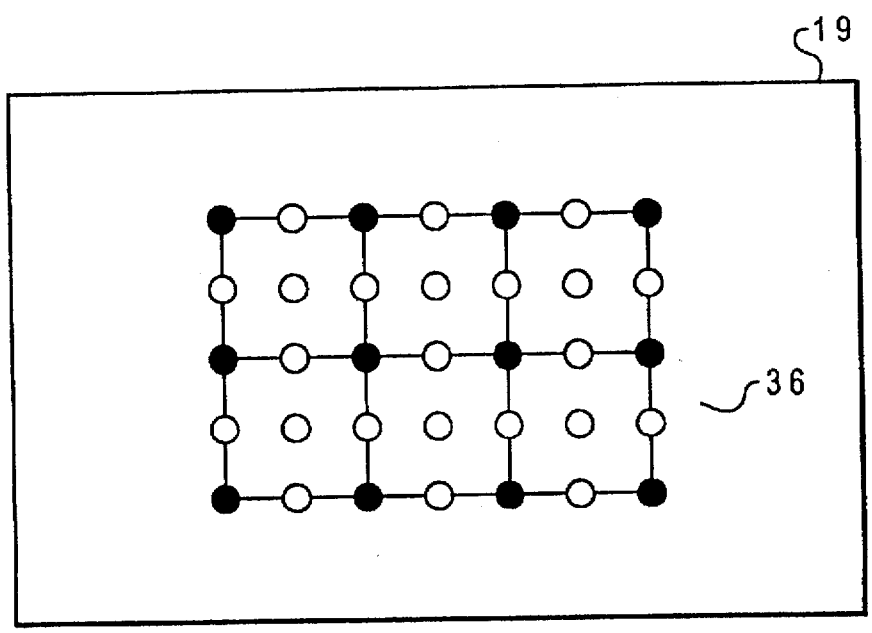
FIG. 5 illustrates a pictorial representation of a second intermediate image having a second intermediate image size of 7 pixels by 5 lines displayed on a display within a data processing system in accordance with the method and system of the present invention.

FIG. 5 depicts a pictorial representation of a second intermediate image 36 having an image size of 7 pixels by 5 lines displayed on display 19 and created within data processing system 10, wherein the second intermediate image is determined utilizing the first intermediate image and bilinear interpolation in the horizontal direction in accordance with the method and system of the present invention.

Second intermediate image 36 is created from first intermediate image 34 utilizing bilinear interpolation in the horizontal direction only and the intermediate factor of 2. Additional pixels are added to create a resulting second intermediate image size of 7 pixels by 5 lines.

Figure 6:
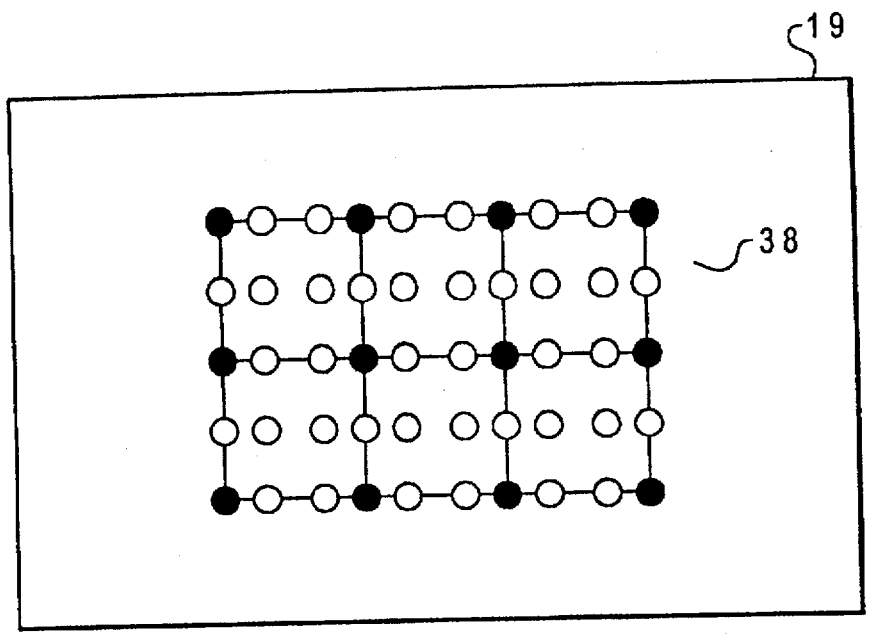
FIG. 6 depicts a pictorial representation of a third intermediate image having a third intermediate image size of 10 pixels by 5 lines displayed on a display within a data processing system in accordance with the method and system of the present invention.

FIG. 6 depicts a pictorial representation of a third intermediate image 38 having an image size of 10 pixels by 5 lines displayed on display 19 and created within data processing system 10, wherein the third intermediate image is determined utilizing the second intermediate image and a nearest neighbor interpolation in the horizontal direction in accordance with the method and system of the present invention.

Third intermediate image 38 is created from second intermediate image 36 utilizing nearest neighbor interpolation in the horizontal direction only, the intermediate factor of 2, and the enlargement factor in the horizontal direction. Additional pixels are added to create a resulting third intermediate image size of 10 pixels by 5 lines.

FIG. 7 depicts a pictorial representation of final image 32 having an image size of 10 pixels by 8 lines created and displayed on display 19 within data processing system 10, wherein the final image is determined utilizing the third intermediate image and nearest neighbor interpolation in the vertical direction in accordance with the method and system of the present invention.

Final image 32 is created from third intermediate image 38 utilizing nearest neighbor interpolation in the vertical direction only, the intermediate factor of 2, and the enlargement factor in the vertical direction. Additional pixels are added to create a resulting final image size of 10 pixels by 8 lines.

FIGS. 8A–8E together depict a high-level flow chart illustrating the utilization of both bilinear interpolation and nearest neighbor interpolation to create a final image in response to an enlargement factor being greater than an intermediate factor in accordance with the method and system of the present invention.

The process starts at block 100 and thereafter passes to block 102 which illustrates a determination of the enlargement factor in the vertical direction (VRF). The enlargement factor in the vertical direction is equal to the image size in the vertical direction of the final image minus one divided by the image size in the vertical direction of the initial image minus one. The process then passes to block 102 which depicts a determination of the enlargement factor in the horizontal direction (HRF). The enlargement factor in the horizontal direction is equal to the image size in the horizontal direction of the final image minus one divided by the image size in the horizontal direction of the initial image minus one.

The process then passes to block 106 which illustrates a determination of whether or not the enlargement factor in the vertical direction is greater than the intermediate factor of 2. If a determination is made that the enlargement factor in the vertical direction is greater than the intermediate factor of 2, the process passes to block 108 which depicts the setting of the bilinear source vertical size equal to the initial image vertical size. Block 110 thereafter illustrates the setting of the bilinear target vertical size equal to two times the initial image vertical size, minus one. Next, block 112 depicts the setting of the nearest neighbor filter (NNF) source vertical size equal to two times the initial image vertical size, minus one. The process then passes to block 114 which illustrates the setting of the nearest neighbor filter final vertical size equal to the final image vertical size. The process then passes to block 126 through block 116.

Referring again to block 106, if a determination is made that the enlargement factor in the vertical is not greater than the intermediate factor of 2, the process passes to block 118 which depicts the setting of the bilinear source vertical size equal to the initial image vertical size. Block 120 thereafter illustrates the setting of the bilinear target vertical size equal to the final image vertical size. Next, block 122 depicts the setting of the nearest neighbor filter (NNF) source vertical size equal to the final image vertical size. The process then passes to block 124 which illustrates the setting of the nearest neighbor filter final vertical size equal to the final image vertical size. The process then passes to block 126 through block 116.

Block 126 depicts a determination of whether or not the enlargement factor in the horizontal direction is greater than the intermediate factor of 2. If a determination is made that the enlargement factor in the horizontal direction is greater than the intermediate factor of 2, the process passes to block 128 which depicts the setting of the bilinear source horizontal size equal to the initial image horizontal size. Block 130 thereafter illustrates the setting of the bilinear target horizontal size equal to two times the initial image horizontal size, minus one. Next, block 132 depicts the setting of the nearest neighbor filter (NNF) source horizontal size equal to two times the initial image horizontal size, minus one. The process then passes to block 134 which illustrates the setting of the nearest neighbor filter final horizontal size equal to the final image horizontal size. The process then passes to block 146 through block 136.

Referring again to block 126, if a determination is made that the enlargement factor in the horizontal direction is not greater than the intermediate factor of 2, the process passes to block 138 which depicts the setting of the bilinear source horizontal size equal to the initial image horizontal size. Block 140 thereafter illustrates the setting of the bilinear target horizontal size equal to the final image horizontal size. Next, block 142 depicts the setting of the nearest neighbor filter (NNF) source horizontal size equal to the final image horizontal size. The process then passes to block 144 which illustrates the setting of the nearest neighbor filter final horizontal size equal to the final image horizontal size. The process then passes to block 146 through block 136.

In the event the enlargement factor in the vertical direction is greater than 2, the bilinear source vertical size will be the vertical size of initial image 30; the bilinear target vertical size will be the vertical size of first intermediate image 34; the nearest neighbor source vertical size will be the vertical size of the second intermediate image 36; and, the nearest neighbor target vertical size will be the vertical size of final image 32.

In the event the enlargement factor in the horizontal direction is greater than 2, the bilinear source horizontal size will be the horizontal size of first intermediate image 34; the bilinear target horizontal size will be the horizontal size of second intermediate image 36; the nearest neighbor source horizontal size will be the horizontal size of the second intermediate image 36; and, the nearest neighbor target horizontal size will be the horizontal size of final image 32.

Block 146 depicts the setting the vertical factor (VF) equal to the quotient of the bilinear filter, (BF), source image vertical size minus one divided by the bilinear target image vertical size minus one. Next, block 148 illustrates the setting of I equal to zero; NF equal to zero; and L equal to zero. Thereafter, block 150 depicts a determination of whether or not L is less than the bilinear filter target image vertical size (YBPIX).

If a determination is made that L is less than the bilinear filter target vertical size (YBPIX), the process passes to block 152 which illustrates the setting of J equal to zero. Block 154 then depicts a determination of whether or not J is less than the source image horizontal size (XPIX). If a determination is made that J is less than the source image horizontal size (XPIX), the process passes to block 156 which illustrates a determination of the value of a pixel to be displayed in the bilinear target image, a bilinear target pixel. Block 156 illustrates a bilinear target pixel having an index of L times the source image horizontal size (XPIX) plus J. A pixel having an index of zero will be the first pixel, i.e. the pixel in the upper left corner of the target image. A pixel having an index of one will be the second pixel, and a pixel having an index of two will be the third pixel.

The value of the bilinear target pixel equals the sum of one minus NF times the source pixel having an index of I times the source image horizontal size plus J and NF times the source pixel having an index of I plus one times the source image horizontal size plus J. Next, block 158 illustrates the setting of a new value of J equal to the old value of J plus one. Thereafter, the process passes to block 154.

Referring again to block 154, if a determination is made that J is not less than the source image horizontal size (XPIX), the process passes to block 160 which illustrates the setting of a new value of NF equal to the old value of NF plus the vertical factor (VF). Next, block 162 depicts a determination of whether or not the new value of NF is greater than or equal to one. If a determination is made that the new value of NF is greater than or equal to one, the process passes to block 164 which illustrates the setting of a new value of I equal to the old value of I plus one. Next, block 166 depicts the setting of a new value of NF equal to the old value of NF minus one. The process then passes to block 168 which illustrates the setting of a new value of L equal to the old value of L plus one. The process then passes back to block 150. Referring again to block 162, if a determination is made that the new value of NF is not greater than or equal to one, the process passes to block 168.

Referring again to block 150, if a determination is made that L is not less than the bilinear filter target vertical size (YBPIX), the process passes to block 172 as depicted through block 170. Block 172 illustrates the setting of the horizontal factor (HF) equal to the quotient of the bilinear filter source horizontal size minus one divided by the bilinear filter target horizontal size minus one. Next, block 174 illustrates the setting of I equal to zero. The process then passes to block 176 which depicts a determination of whether or not I is less than the bilinear filter target vertical size (YBPIX). If a determination is made that I is less than the bilinear filter target vertical size (YBPIX), the process passes to block 178 which illustrates the setting of J equal to zero; NF equal to zero; and K equal to zero.

The process then passes to block 180 which depicts a determination of whether or not K is less than the bilinear filter target horizontal size (XBPIX). If a determination is made that K is not less than the bilinear filter horizontal size, the process passes to block 182 which illustrates the setting of a new value of I equal to the old value of I plus one. The process passes to block 176.

Referring again to block 180, if a determination is made that K is less than the bilinear filter target horizontal size (XBPIX), the process passes to block 184 which illustrates the determination of a value of a bilinear filter target pixel having an index of I times the bilinear filter target horizontal size (XBPIX) plus K. The value of a bilinear filter target pixel is equal to the sum of one minus NF times a source pixel having an index of I times the bilinear target vertical size plus J and NF times a source pixel having an index of I times the bilinear target vertical size plus J plus one. The process then passes to block 186 which illustrates the setting of a new value for NF equal to the old value of NF plus the horizontal factor. Next, block 188 illustrates a determination of whether or not NF is greater than or equal to one. If a determination is made that NF is greater than or equal to one, the process passes to block 190 which depicts the setting of a new value of J equal to the old value of J plus one. Next, block 192 illustrates the setting of a new value of NF equal to the old value of NF minus one. The process then passes to block 194 which depicts the setting of a new value of K equal to the old value of K plus one. The process then passes to block 180. Referring again to block 188, if a determination is made that NF is not equal to or greater than one, the process passes to block 194.

Referring again to block 176, if a determination is made that I is not less than the bilinear filter target vertical size (YBPIX), the process passes to block 198 as depicted through block 196. Block 198 illustrates the determination of a vertical factor (VF) for nearest neighbor interpolation. The vertical factor is equal to the quotient of the nearest, neighbor factor source vertical size minus one divided by the nearest neighbor factor target vertical size minus one. Next, block 200 illustrates the setting of a horizontal factor (HF) for nearest neighbor interpolation. The horizontal factor is equal to the quotient of the nearest neighbor factor source horizontal size minus one divided by the nearest neighbor factor target horizontal size minus one.

The process then passes to block 202 which depicts the setting of I equal to zero; NVF equal to zero; and M equal to zero. Next, block 204 illustrates a determination of whether or not M is less than the nearest neighbor target image vertical size (YSPIX). If a determination is made that M is not less than the nearest neighbor target vertical size (YSPIX), the process terminates as depicted at block 206. If a determination is made that M is less than the nearest neighbor target vertical size (YSPIX), the process passes to block 208 which illustrates the setting of N equal to zero; NHF equal to zero; and K equal to zero. Thereafter, the process passes to block 210 which depicts a determination of whether or not K is less then the nearest neighbor target horizontal size (XSPIX). If a determination is made that K is not less then the nearest neighbor target horizontal size (XSPIX), the process passes to block 212 which illustrates the setting of a new value of NVF equal to the old value of NVF plus the vertical factor; I equal to the new value of NVF plus 0.5; and a new value of M equal to the old value of M plus one. The process then passes to block 204.

Referring again to block 210, if a determination is made that K is less then the nearest neighbor target image horizontal size (XSPIX), the process passes to block 214 which illustrates the determination of a value for the nearest neighbor target image pixel having an index of M times the nearest neighbor target horizontal size plus K. The nearest neighbor target pixel has a value equal to the nearest neighbor source image pixel having an index of I times the nearest neighbor source image horizontal size (XBPIX) plus N. The process then passes to block 216 which depicts the setting of a new value of NHF equal to the old value of NHF plus the horizontal factor. Next, block 218 illustrates the setting of N equal to the new value of NHF plus 0.5. Thereafter, block 220 depicts the setting of a new value of K equal to the old value of K plus one. The process then passes to block 210.

While the invention has been particularly shown and described with reference to a preferred embodiment, it will be understood by those skilled in the art that various changes in form and detail may be made therein without departing from the spirit and scope of the invention.

I claim:

1. A method in a data processing system for improving image resolution during enlargement of images within a video sequence of images, said method comprising the data processing implemented steps of:

determining an enlargement factor for creating a final image having a final image size from an initial image having an initial image size, wherein said initial image is included within a video sequence of images;

establishing an intermediate factor, wherein said intermediate factor is established to optimize image resolution and said data processing system;

in response to said enlargement factor being less than said intermediate factor, creating said final image from said initial image utilizing said enlargement factor and bilinear interpolation;

in response to said enlargement factor being greater than said intermediate factor, creating an intermediate image having an intermediate image size from said initial image utilizing said intermediate factor and bilinear interpolation, and then creating said final image from said intermediate image utilizing said enlargement factor, said intermediate factor, and nearest neighbor interpolation, wherein said intermediate image size is greater than said initial image size and less than said final image size.

2. The method according to claim 1, wherein said step of determining an enlargement factor further comprises the step of establishing an enlargement factors equal to the quotient of said final image size minus one divided by said initial image size minus one.

3. The method according to claim 1, wherein said step of creating said intermediate image further comprises the steps of, responsive to said enlargement factor being greater than said intermediate factor, creating a first intermediate image having a first intermediate image size from said initial image utilizing said intermediate factor and bilinear interpolation, and creating said intermediate image having said intermediate size from said first intermediate image utilizing said intermediate factor and bilinear interpolation.

4. The method according to claim 3, wherein said initial image includes a vertical size and said first intermediate image includes a vertical size, further wherein said step of creating said first intermediate image comprises the step of creating said first intermediate image having a vertical size which is larger than said vertical size of said initial image by a factor equal to said intermediate factor.

5. The method according to claim 4, wherein said first intermediate image includes a horizontal size and said intermediate image having a vertical size equal to said vertical size of said first intermediate image, said intermediate image also including a horizontal size, further wherein said step of creating said intermediate image comprises the step of creating said intermediate image having a horizontal size which is larger than said horizontal size of said first intermediate image by a factor equal to said intermediate factor.

6. The method according to claim 5, wherein said final image includes a vertical size, further wherein said step of creating said final image from said intermediate image further comprises the step of creating said final image having a vertical size which is greater than said vertical size of said intermediate image by a factor equal to said enlargement factor divided by said intermediate factor.

7. The method according to claim 7, wherein said final image further includes a horizontal size, further wherein said step of creating said final image from said intermediate image further comprises the step of creating said final image having a horizontal size which is greater than said horizontal size of said intermediate image by a factor equal to said enlargement factor divided by said intermediate factor.

8. The method according to claim 1, wherein said step of creating said final image from said intermediate image utilizing said enlargement factor, said intermediate factor, and nearest neighbor interpolation further comprises the steps of:

determining the quotient of said final size divided by said intermediate size; and creating said final image from intermediate image utilizing said quotient and nearest neighbor interpolation.

9. The method according to claim 1, wherein said step of establishing an intermediate factor further comprises the step of establishing an intermediate factor of 2.

10. The method according to claim 1, wherein said step of creating an intermediate image having an intermediate image size further comprises creating an intermediate image having an intermediate image size greater then said initial image size by a factor equal to said intermediate factor, and wherein said step of creating said final image further comprises creating said final image having a final image size greater than said intermediate image size by a factor equal to said enlargement factor divided by said intermediate factor.

11. The method according to claim 1, wherein said video sequence of images is generated utilizing a video camera.

12. The method according to claim 1, wherein said video sequence of images is generated utilizing a video cassette recorder.

13. A data processing system for improving image resolution during enlargement of an image included within a video sequence of images, comprising:

means for determining an enlargement factor for creating a final image having a final image size from an initial image having an initial image size, wherein said initial image is included within a video sequence of images;

means for establishing an intermediate factor, wherein said intermediate factor is established to optimize image resolution and said data processing system;

means responsive to said enlargement factor being less than said intermediate factor, for creating said final image from said initial image utilizing said enlargement factor and bilinear interpolation;

means responsive to said enlargement factor being greater than said intermediate factor, for creating an intermediate image having an intermediate image size from said initial image utilizing said intermediate factor and bilinear interpolation, and then creating said final image from said intermediate image utilizing said enlargement factor, said intermediate factor, and nearest neighbor interpolation, wherein said intermediate image size is greater than said initial image size and less than said final image size.

14. The system according to claim 13, wherein said means for determining an enlargement factor further comprises means for establishing an enlargement factor equal to the quotient of said final image size minus one divided by said initial image size minus one.

15. The system according to claim 13, wherein said means for creating said intermediate image further comprises means responsive to said enlargement factor being greater than said intermediate factor for creating a first intermediate image having a first intermediate image size from said initial image utilizing said intermediate factor and bilinear interpolation, and for creating said intermediate image having said intermediate image size from said first intermediate image utilizing said intermediate factor and bilinear interpolation.

16. The system according to claim 15, wherein said initial image includes a vertical size and said first intermediate image includes a vertical size, further wherein said means for creating said first intermediate image comprises means for creating said first intermediate image having a vertical size which is larger than said vertical size of said initial image by a factor equal to said intermediate factor.

17. The system according to claim 16, wherein said first intermediate image includes a horizontal size and said intermediate image having a vertical size equal to said vertical size of said first intermediate image, said intermediate image also including a horizontal size, further wherein said means for creating said intermediate image comprises means for creating said intermediate image having a horizontal size which is larger than said horizontal size of said first intermediate image by a factor equal to said intermediate factor.

18. The system according to claim 17, wherein said final image includes a vertical size, further wherein said means for creating said final image from said intermediate image further comprises means for creating said final image having a vertical size which is greater than said vertical size of said intermediate image by a factor equal to said enlargement factor divided by said intermediate factor.

19. The system according to claim 18, wherein said final image further includes a horizontal size, further wherein said means for creating said final image from said intermediate image further comprises means for creating said final image having a horizontal size which is greater than said horizontal size of said intermediate image by a factor equal to said enlargement factor divided by said intermediate factor.

20. The system according to claim 13, wherein said means for creating said final image from said intermediate image utilizing said enlargement factor, said intermediate factor, and nearest neighbor interpolation further comprises:

means for determining the quotient of said final size divided by said intermediate size; and means for creating said final image from intermediate image utilizing said quotient and nearest neighbor interpolation.

21. The system according to claim 13, wherein said means for creating an intermediate image having an intermediate image size further comprises means for creating an intermediate image having an intermediate image size then said initial image size by a factor equal to said intermediate factor, and wherein said means for creating said final image further comprises means for creating said final image having a final image size greater than said intermediate image size by a factor equal to said enlargement factor divided by said intermediate factor.

22. The system according to claim 13, wherein said video sequence of images is generated utilizing a video camera.

23. The system according to claim 13, wherein said video sequence of images is generated utilizing a video cassette recorder.

* * * * *